(12) United States Patent
Xu et al.

(10) Patent No.: US 10,979,927 B2
(45) Date of Patent: Apr. 13, 2021

(54) CROSS LINK INTERFERENCE MEASUREMENT AND REPORTING

(71) Applicant: QUALCOMM Incorporated, San Diego, CA (US)

(72) Inventors: Huilin Xu, San Diego, CA (US); Peter Gaal, San Diego, CA (US); Aamod Khandekar, San Diego, CA (US); Alexei Yurievitch Gorokhov, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/801,070

(22) Filed: Feb. 25, 2020

(65) Prior Publication Data

US 2020/0275298 A1    Aug. 27, 2020

Related U.S. Application Data

(60) Provisional application No. 62/810,892, filed on Feb. 26, 2019.

(51) Int. Cl.
*H04W 24/10* (2009.01)
*H04L 25/02* (2006.01)
(Continued)

(52) U.S. Cl.
CPC .......... *H04W 24/10* (2013.01); *H04L 5/0051* (2013.01); *H04L 25/0226* (2013.01); *H04W 56/001* (2013.01); *H04W 76/28* (2018.02)

(58) Field of Classification Search
CPC ... H04W 24/10; H04W 76/28; H04W 56/001; H04L 5/0051; H04L 25/0226
See application file for complete search history.

(56) References Cited

U.S. PATENT DOCUMENTS

| 2014/0200016 A1* | 7/2014 | Siomina | H04W 24/10 |
| | | | 455/450 |
| 2017/0094621 A1* | 3/2017 | Xu | H04L 47/125 |

(Continued)

FOREIGN PATENT DOCUMENTS

| CN | 108024363 A | 5/2018 |
| EP | 3567759 A1 | 11/2019 |

(Continued)

OTHER PUBLICATIONS

International Search Report and Written Opinion — PCT/US2020/019970 — ISA/EPO — Jun. 16, 2020.

*Primary Examiner* — Mohammad S Anwar
(74) *Attorney, Agent, or Firm* — Michael De Haemer, Jr.

(57) ABSTRACT

Various aspects of the present disclosure generally relate to wireless communication. In some aspects, a base station (BS) may configure a UE to transmit a cross link interference reference signal (CLI-RS) using a bandwidth and frequency similar to those used for a synchronization signal. In another aspect, a BS may may configure a UE to measure a cross link interference reference signal (CLI-RS) transmitted using a bandwidth and frequency similar to those used for a synchronization signal. In other aspects, a base station may transmit, to a UE, an instruction to transmit or measure a CLI-RS. Numerous other aspects are provided.

19 Claims, 14 Drawing Sheets

(51) Int. Cl.
    *H04W 76/28*     (2018.01)
    *H04W 56/00*     (2009.01)
    *H04L 5/00*     (2006.01)

(56) References Cited

U.S. PATENT DOCUMENTS

| | | | |
|---|---|---|---|
| 2018/0323916 A1* | 11/2018 | Yang | H04W 16/18 |
| 2018/0323928 A1* | 11/2018 | Yang | H04L 5/0048 |
| 2018/0368017 A1* | 12/2018 | Sundararajan | H04W 72/085 |
| 2019/0089502 A1* | 3/2019 | Yi | H04L 5/14 |
| 2019/0364449 A1 | 11/2019 | Yang et al. | |

FOREIGN PATENT DOCUMENTS

| | | |
|---|---|---|
| WO | 2018128297 A1 | 7/2018 |
| WO | 2019032031 A1 | 2/2019 |

* cited by examiner

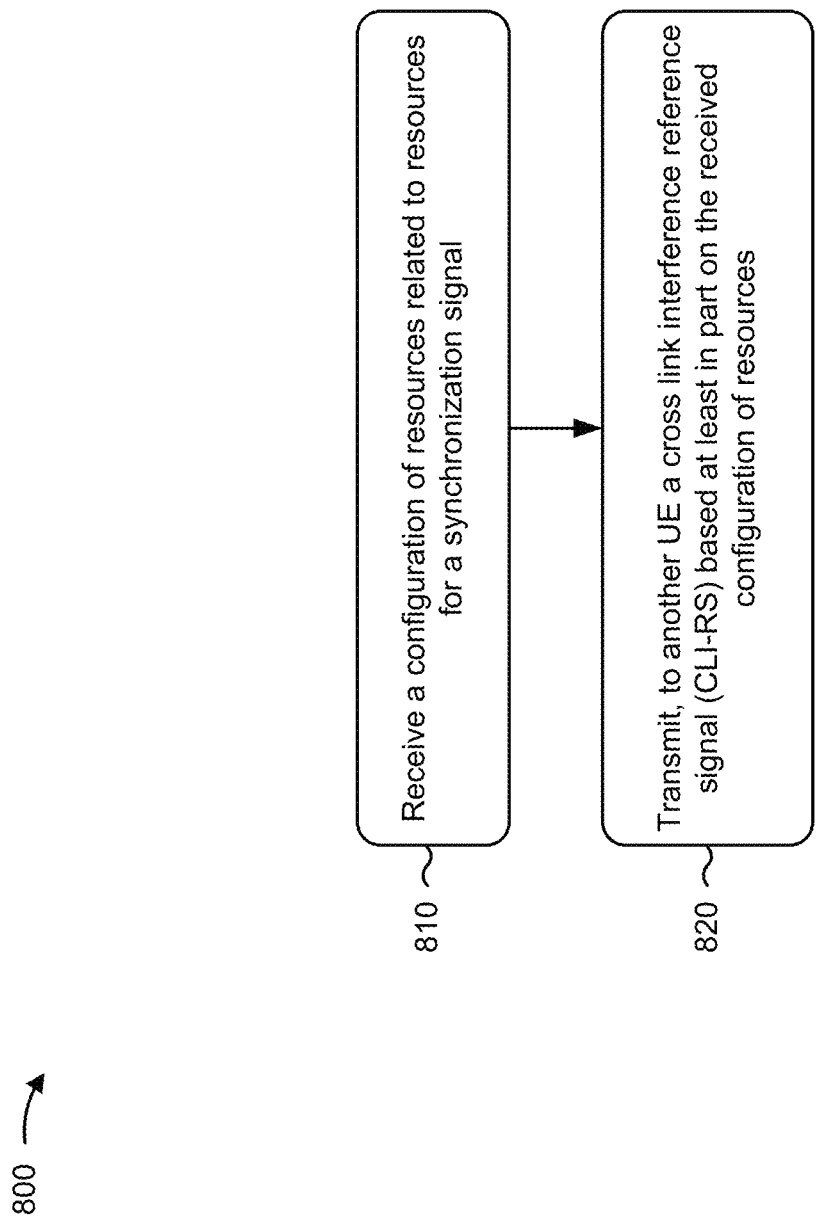

CROSS LINK INTERFERENCE MEASUREMENT AND REPORTING

CLAIM OF PRIORITY UNDER 35 U.S.C. § 119

This application claims the benefit of U.S. Provisional Application Ser. No. 62/810,892, entitled "CROSS LINK INTERFERENCE MEASUREMENT AND REPORTING" filed on Feb. 26, 2019 which is expressly incorporated by reference herein in its entirety.

FIELD OF THE DISCLOSURE

Aspects of the present disclosure generally relate to wireless communication, and more particularly to techniques and apparatuses for cross link interference measurement and reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method is disclosed for wireless communication at a first user equipment (UE) served by a cell associated with a base station, including receiving a configuration identifying resources for transmitting a cross-link interference (CLI) sounding reference signal (SRS) to a second UE, the resources being based on a synchronization signal transmitted by a base station of the first or second UE; and transmitting, to the second UE, the CLI SRS in the resources according to the configuration. The resources may be preconfigured or may be configured by control signalling. In an aspect the first UE may transmit the CLI RS during an active portion of a DRX cycle.

In another aspect, a method is disclosed for wireless communication at a second user equipment (UE) served by a cell associated with a base station, including receiving a configuration identifying resources for transmission of a cross-link interference (CLI) sounding reference signal (SRS) by a first UE, the resources being based on a synchronization signal transmitted by a base station of the first or second UE; and receiving, from the first UE, the CLI SRS in the resources according to the configuration. The second UE may measure metrics related to the configured resources and may transmit a report of the measured metric to the base station. In an aspect, the second UE may report that it was unable to measure the CLI SRS. The metric may be a reference signal received power (RSRP) or the total received power (RSSI).

In another aspect, the bandwidth of the CLI SRS is within the bandwidth of the synchronization signal or it may be the same as the bandwidth of the synchronization signal. The center frequency of the CLI RS may be the same as the center frequency of the synchronization signal or may be offset from the center frequency of the synchronization signal. In an aspect, the CLI RS may be received during an active portion of a DRX cycle.

In an aspect, a method is disclosed for wireless communication at a base station, including transmitting, to a first UE, a configuration identifying resources for transmitting a cross-link interference (CLI) sounding reference signal (SRS) to a second UE, the resources being based on a synchronization signal transmitted by a base station of the first or second UE; and transmitting, to the first UE, instructions to transmit the CLI SRS according to the configuration.

In another aspect, a method is disclosed for wireless communication at a base station, including transmitting, to a second UE, a configuration identifying resources for transmission of a cross-link interference (CLI) sounding reference signal (SRS) by a first UE, the resources being based on a synchronization signal transmitted by a base station of the first or second UE; and transmitting, to the second UE, instructions to measure the CLI SRS transmitted by the first UE according to the configuration.

In an aspect, the bandwidth of the CLI SRS may be within the bandwidth of the synchronization signal, or may be the same as the bandwidth of the synchronization signal. The center frequency of the CLI SRS may be the same as the center frequency of the synchronization signal, or may be offset therefrom.

In an aspect, the resources for transmission of the CLI RS may be preconfigured and later activated by control signaling. In another aspect, the resources are configured by control signaling. The UE's may be configured to transmit or receive the CLI SRS during an active portion of a DRX cycle.

In an aspect, the second UE measures metrics related to the configured resources. The metrics may include a reference signal received power (RSRP) or a total received power (RSSI). The second UE may be configured to transmit a report of the measured metric to the base station. In an aspect, the report may include an indication that the second UE was unable to receive the CLI SRS.

In some aspects, a method of wireless communication, performed by a base station (BS), may include determining, based at least in part on an uplink transmission schedule for a user equipment (UE), one or more communications that are to be transmitted as a cross link interference reference signal (CLI-RS). The method may include transmitting, to the UE, an instruction to transmit the one or more communications as the CLI-RS during the time window.

In some aspects, a base station for wireless communication may include memory and one or more processors operatively coupled to the memory. The memory and the one or more processors may be configured to determine, based at least in part on an uplink transmission schedule for a user equipment (UE), one or more communications that are to be transmitted as a cross link interference reference signal (CLI-RS). The memory and the one or more processors may be configured to transmit, to the UE, an instruction to transmit the one or more communications as the CLI-RS.

In some aspects, a non-transitory computer-readable medium may store one or more instructions for wireless communication. The one or more instructions, when executed by one or more processors of a base station, may cause the one or more processors to determine, based at least in part on an uplink transmission schedule for a user equipment (UE), one or more communications that are to be transmitted as a cross link interference reference signal (CLI-RS). The one or more instructions, when executed by one or more processors of a base station, may cause the one or more processors to transmit, to the UE, an instruction to transmit the one or more communications as the CLI-RS.

In some aspects, an apparatus for wireless communication may include means for determining, based at least in part on an uplink transmission schedule for a user equipment (UE), one or more communications that are to be transmitted as a cross link interference reference signal (CLI-RS). The apparatus may include means for transmitting, to the UE, an instruction to transmit the one or more communications as the CLI-RS.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8-11 are diagrams illustrating example processes performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
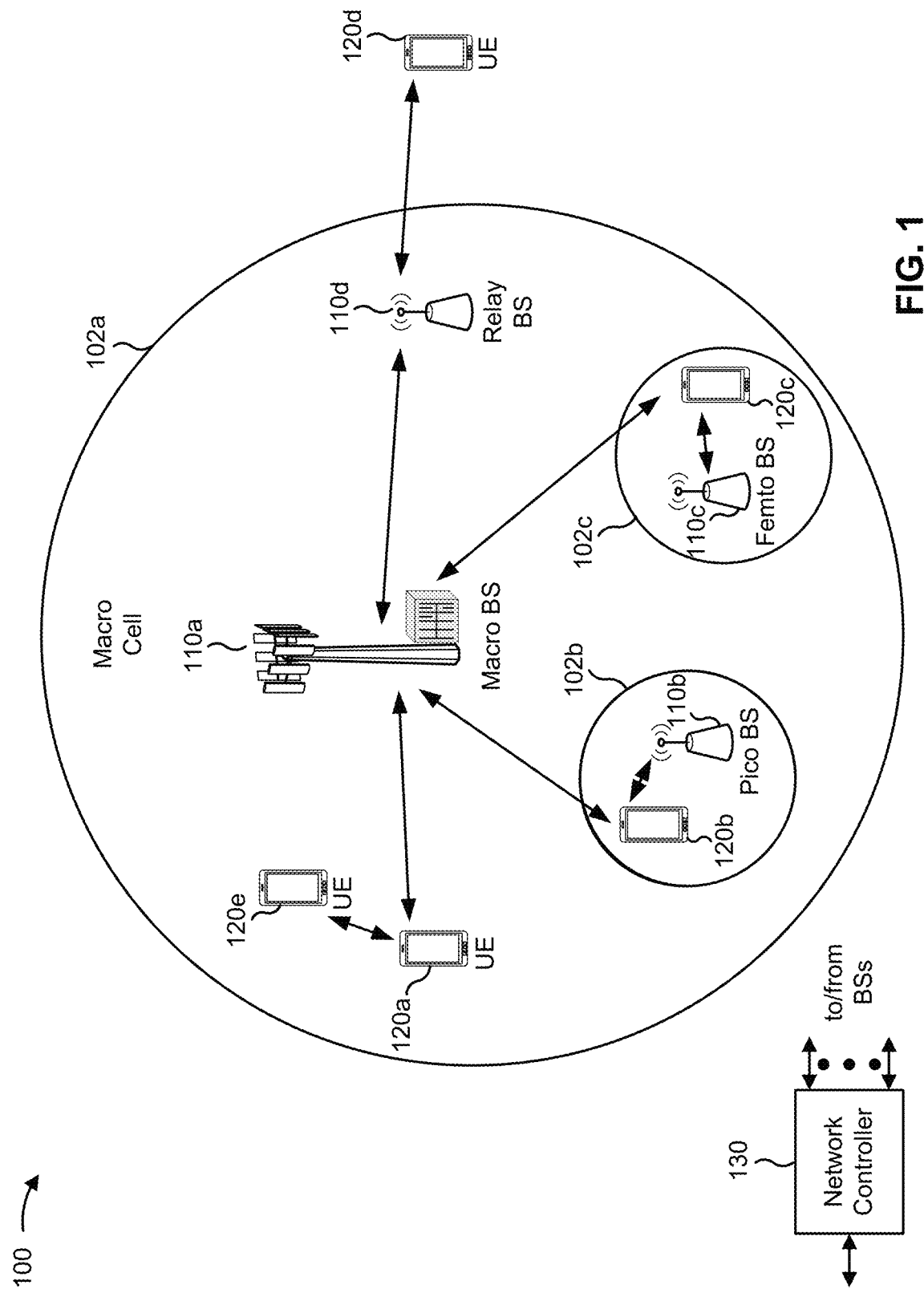
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. FIG. 1 is provided merely as an illustrative example network. Other networks in which aspects of the disclosure may be practiced may differ from what is described with regard to FIG. 1. The network 100 may be an LTE network or some other wireless network, such as a 5G or NR network. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., a remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Figure 2:
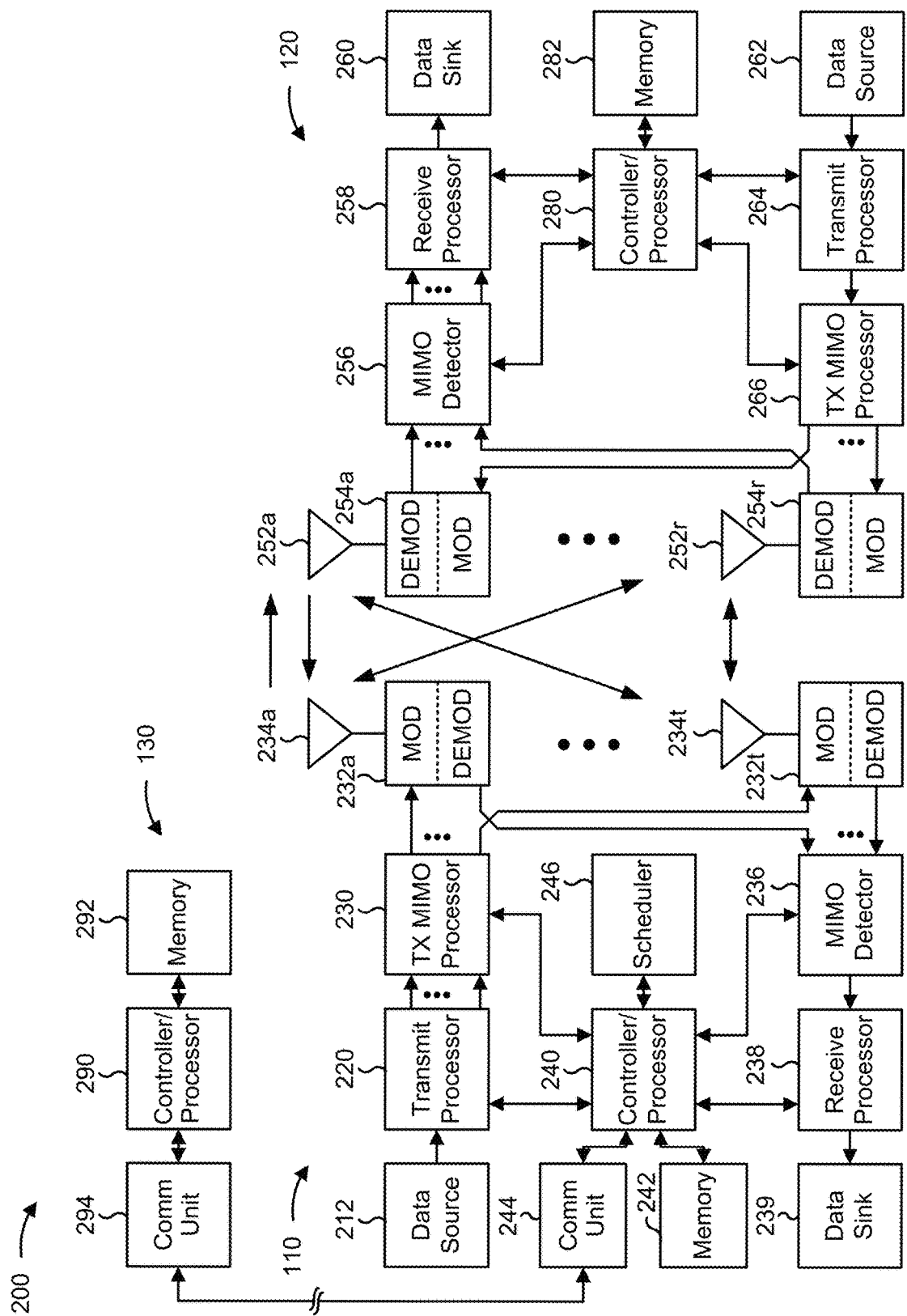
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1. The block diagram of FIG. 2 is provided merely as an example to aid description. Other examples may differ from what is described with regard to FIG. 2.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with cross link interference reference signal configuration, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes or combinations of processes as described herein. Memories 242 and 282 may store data and program codes for base station 110 and UE 120, respectively. A scheduler 246 may schedule UEs for data transmission on the downlink and/or uplink.

In some aspects, base station 110 may include means for determining that a remote interference reference signal (RI-RS) is to be transmitted, means for transmitting, to a user equipment (UE), an instruction to refrain from transmitting a cross link interference reference signal (CLI-RS) during a time window that comprises one or more slots and is determined based at least in part on a slot in which the RI-RS is to be transmitted, and/or the like. In some aspects, base station 110 may include means for determining, based at least in part on an uplink transmission schedule for a user equipment (UE), one or more communications that are to be transmitted as a cross link interference reference signal (CLI-RS) during a time window, means for transmitting, to the UE, an instruction to transmit the one or more communications as the CLI-RS during the time window, and/or the like. In some aspects, base station 110 may include means for determining that a remote interference reference signal (RI-RS) is to be transmitted by another base station 110, means for refraining, based at least in part on determining that the RI-RS is to be transmitted by the other base station 110, from transmitting a cross link interference reference signal (CLI-RS) during a time window in which base station 110 is to receive and measure the RI-RS, wherein the time window comprises one or more slots and is determined based at least in part on a slot in which the RI-RS is to be transmitted, and/or the like. In some aspects, base station 110 may include means for determining that a remote interference reference signal (RI-RS) is to be transmitted by another base station 110, means for refraining, based at least in part on determining that the RI-RS is to be transmitted by the other base station 110, from receiving and measuring a cross link interference reference signal (CLI-RS) during a time window in which base station 110 is to receive and measure the RI-RS, wherein the time window comprises one or more slots and is determined based at least in part on a slot in which the RI-RS is to be transmitted, and/or the like. In some aspects, such means may include one or more components of base station 110 described in connection with FIG. 2.

Figure 3A:
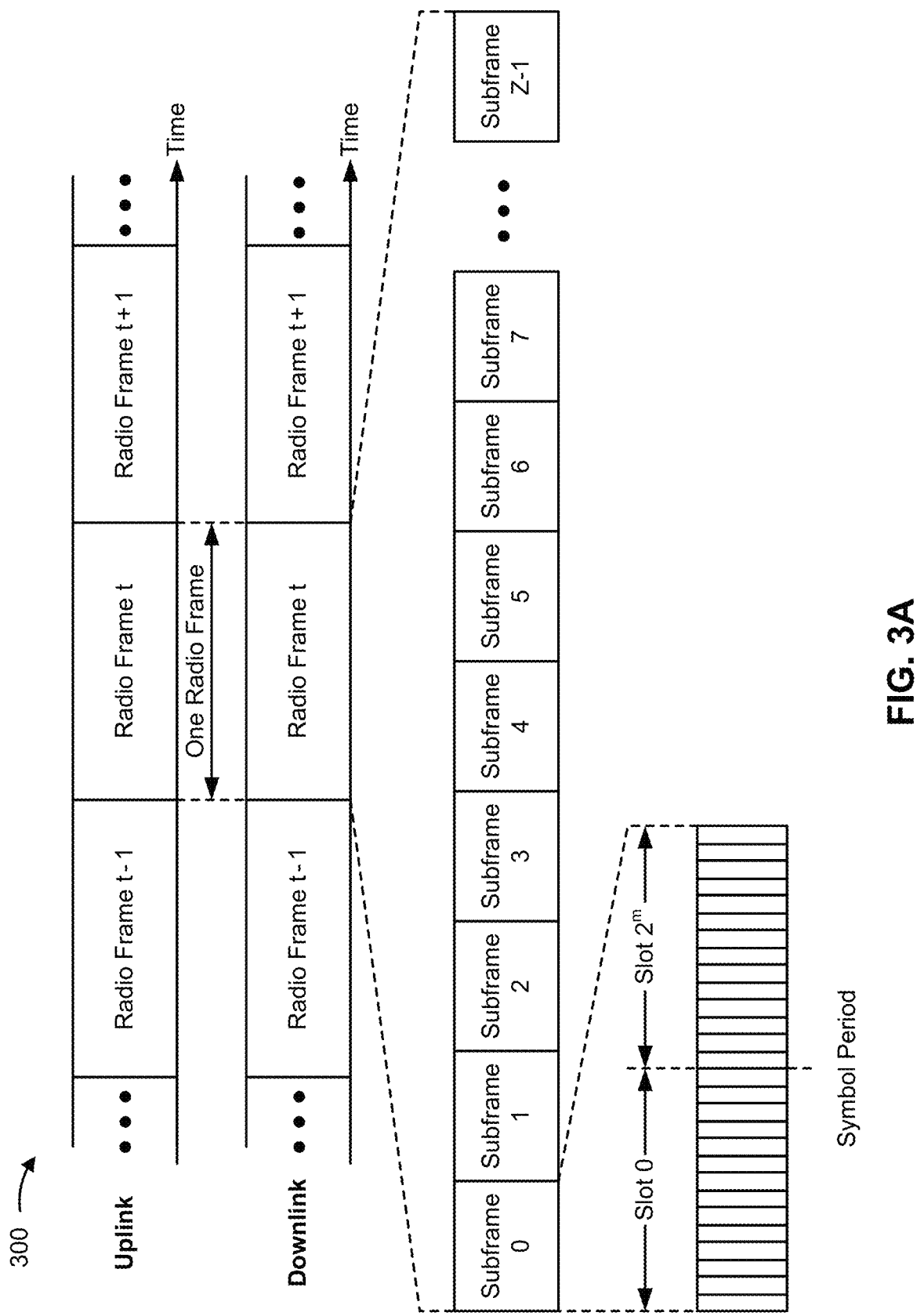
FIG. 3A is a block diagram conceptually illustrating an example of a frame structure in a wireless communication network, in accordance with various aspects of the present disclosure.

FIG. 3A shows an example frame structure 300 for a telecommunications system (e.g., NR). The communication timeline may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit may be frame-based, subframe-based, slot-based, symbol-based, and/or the like.

In some communications systems a portion of a frame, subframe, or slot may used for downlink transmissions and another portion may be used for uplink transmissions. In some aspects, the portions for uplink and downlink transmissions may be fixed. For example, in a 14 symbol slot, the first 6 symbols may be for downlink transmissions and the last 6 symbols may be for uplink transmissions, with a 2 symbol in between. In other aspects, the portions for downlink and uplink transmissions may be configured dynamically. For example, NR predefines many different slot formats which may be dynamically selected by control signaling.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications systems a base station may transmit signals that enable a UE to determine various operating parameters of the BS so that it may communicate with the base station. For example, in some systems (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. To facilitate acquisition, the synchronizstion signals may occupy one or more bandwidths that are known or determinable by a UE. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
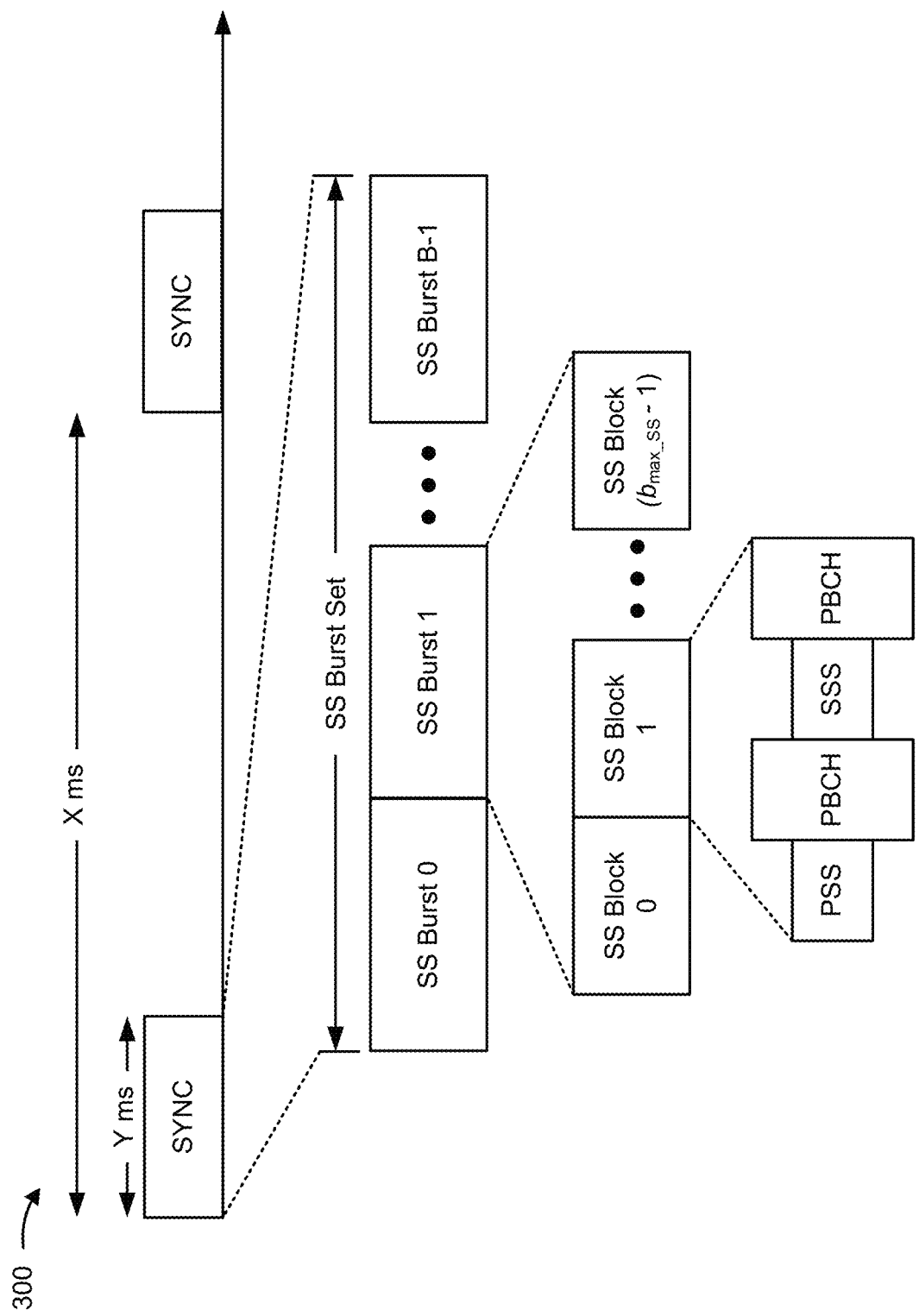
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information or data on a physical downlink control channel (PDCCH) in B symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
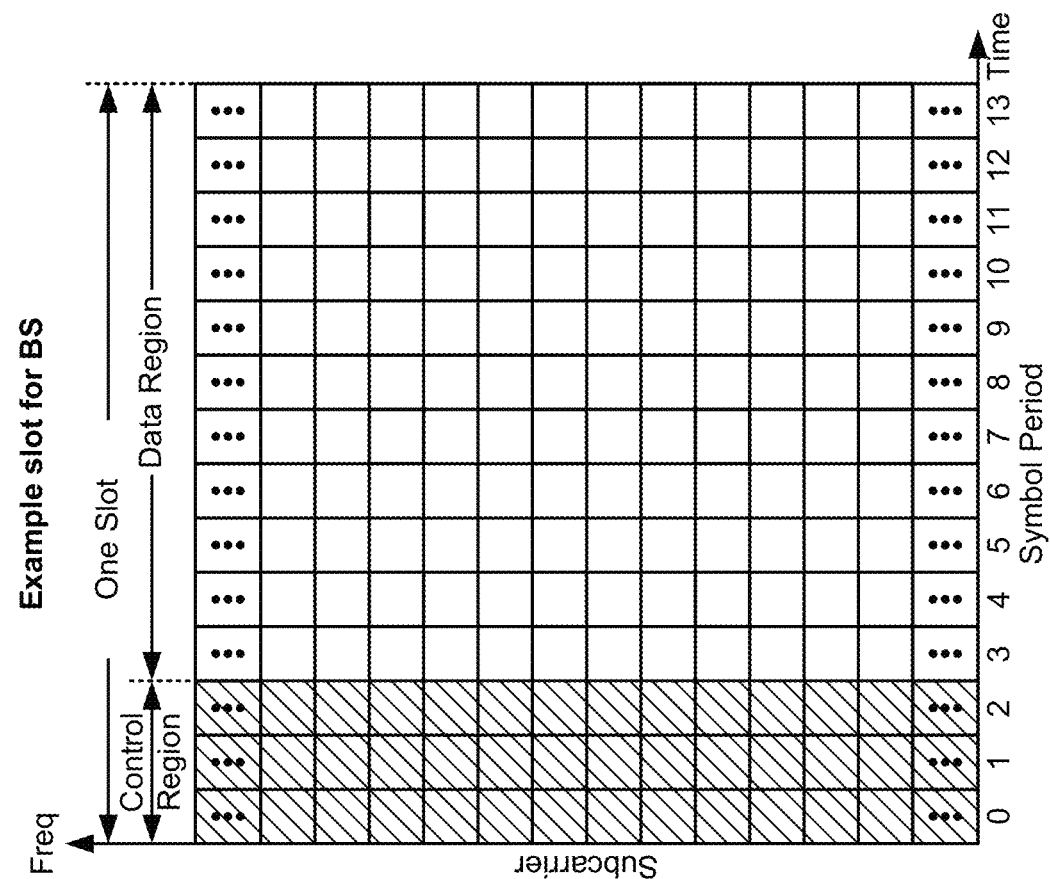
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs. A nearby UE may be served by a different BS. One UEs may be receiving a downlink transmission from its BS while the other UE is transmitting an uplink signal to its BS, resulting I cross-link interference.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
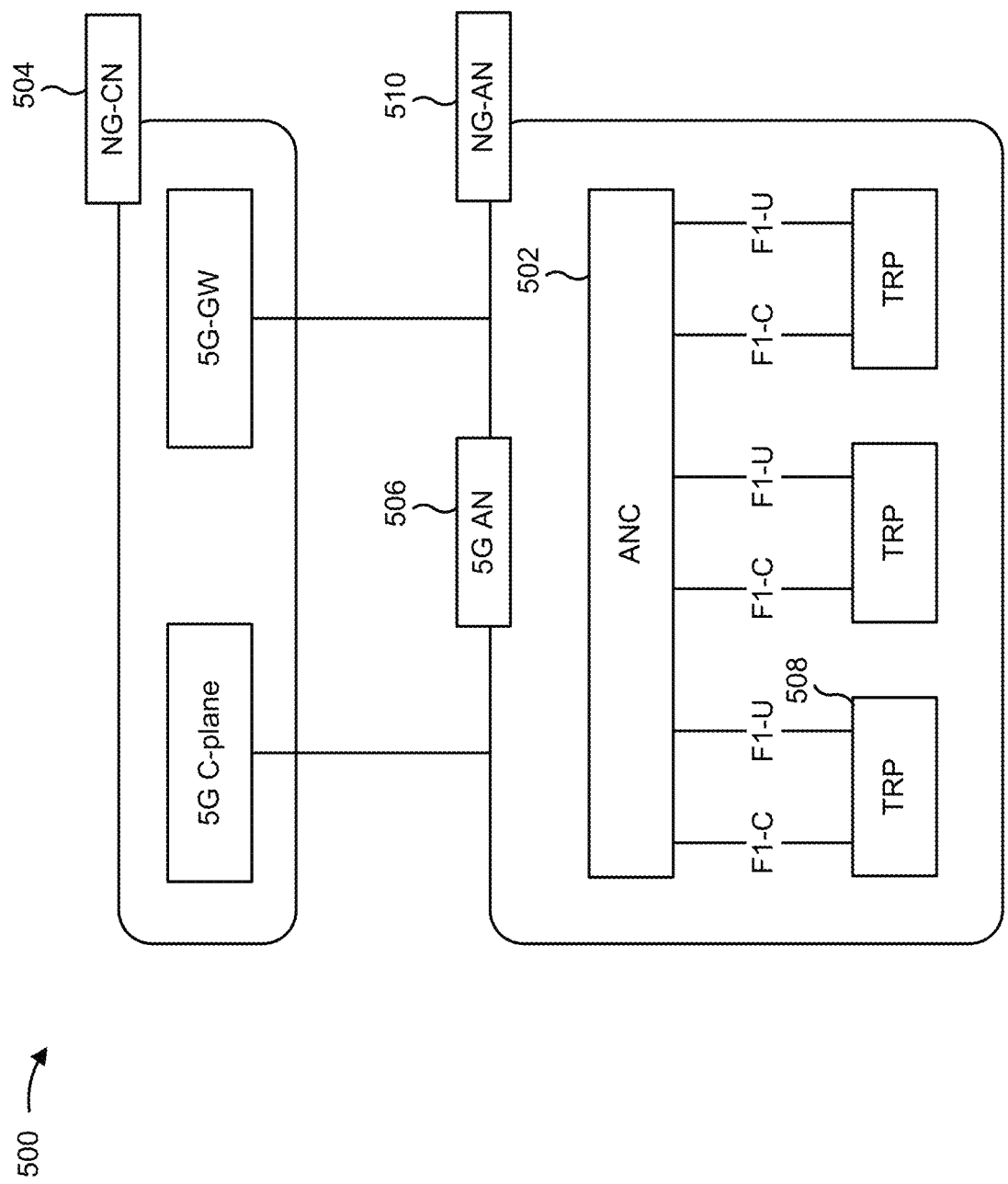
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
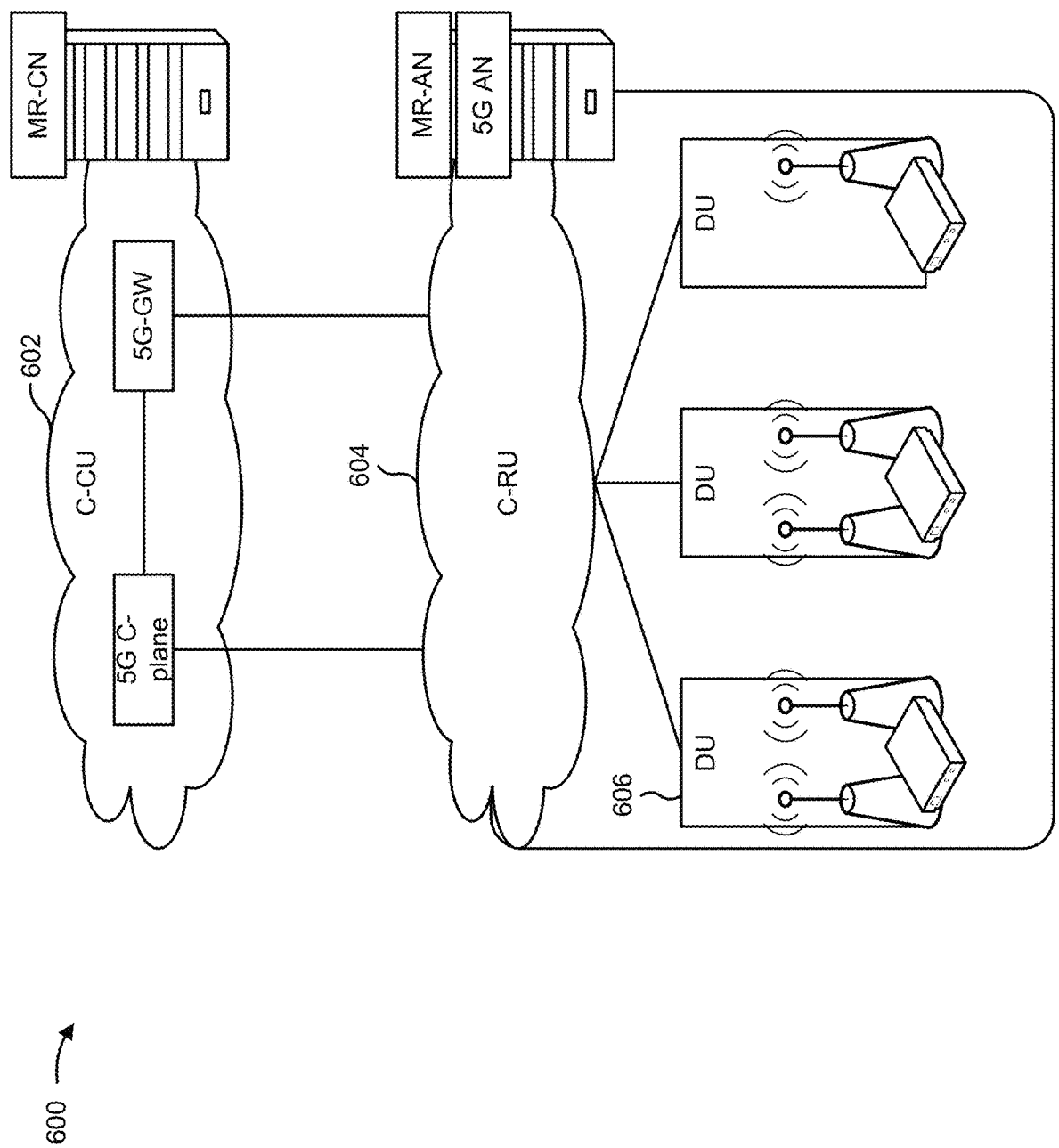
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

Cross link interference (CLI) may refer to interference, with a wireless communication link between a first base station (BS) and a first user equipment (UE), that is caused by transmissions on a wireless communication link between a second BS and a second UE. CLI may occur BS to BS, UE to UE, and/or the like. For example, during a downlink transmission the first UE may experience CLI by caused by an uplink transmission by the second UE. As another example, a downlink transmission by the first BS may cause CLI with an uplink transmission that is received by the second BS.

Some aspects described herein provide techniques and apparatuses for measuring and reporting CLI. In some aspects the measurement and reporting may be used to mitigate the CLI. For instance, an aggressor UE (e.g., a UE that is causing CLI) may transmit a CLI reference signal (CLI-RS) to a victim UE (e.g., a UE that is being interfered with by the CLI). The victim UE may measure the CLI-RS and provide a feedback or measurement report so that one or more transmission parameters of the aggressor UE may be adjusted (e.g., transmit power, frame structure, and/or the like) to reduce and/or eliminate the CLI.

Figure 7A:
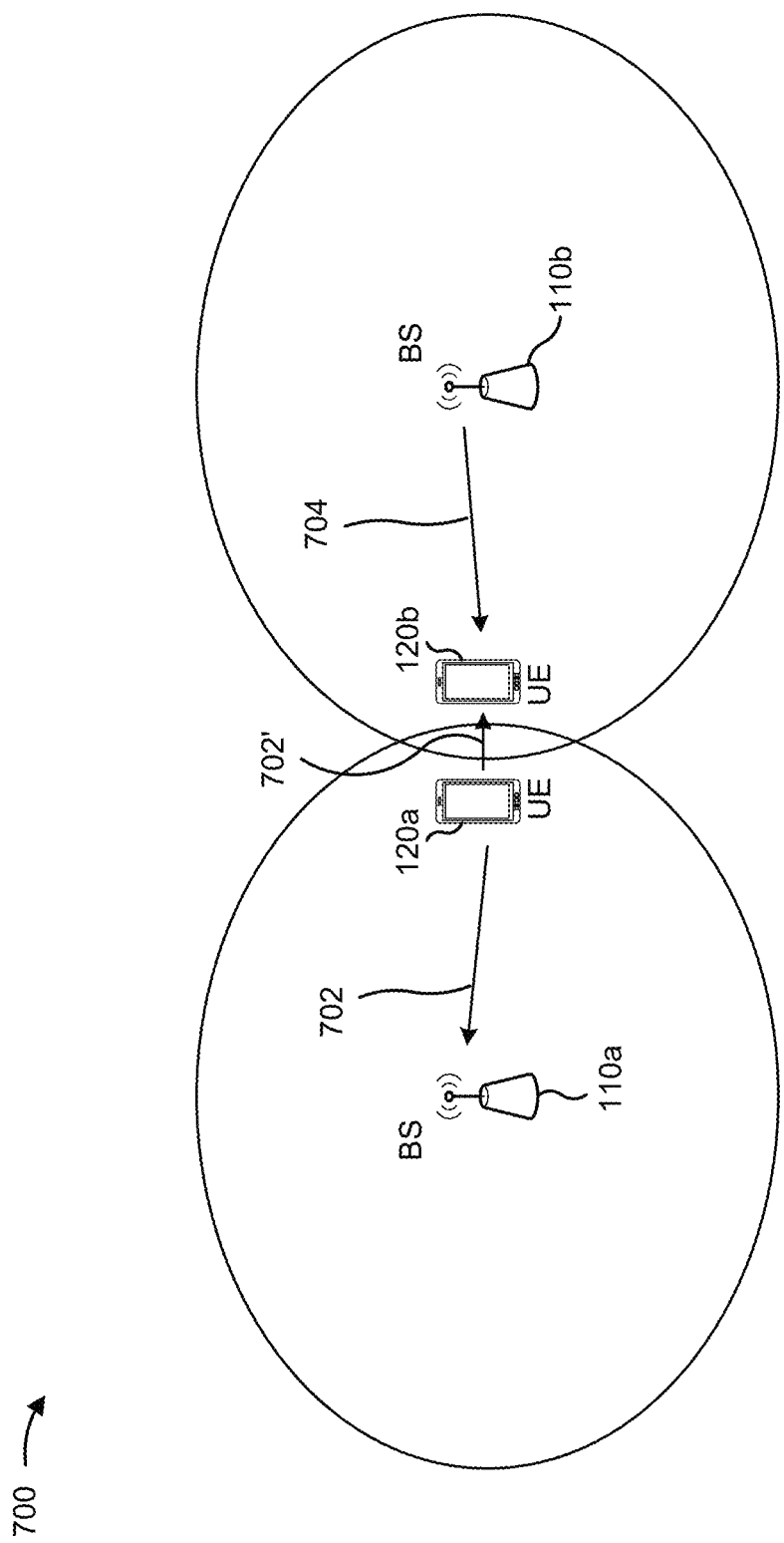
FIGS. 7A-7C are diagrams illustrating an example of cross link interference reference signal configuration, in accordance with various aspects of the present disclosure.
Figure 7B:
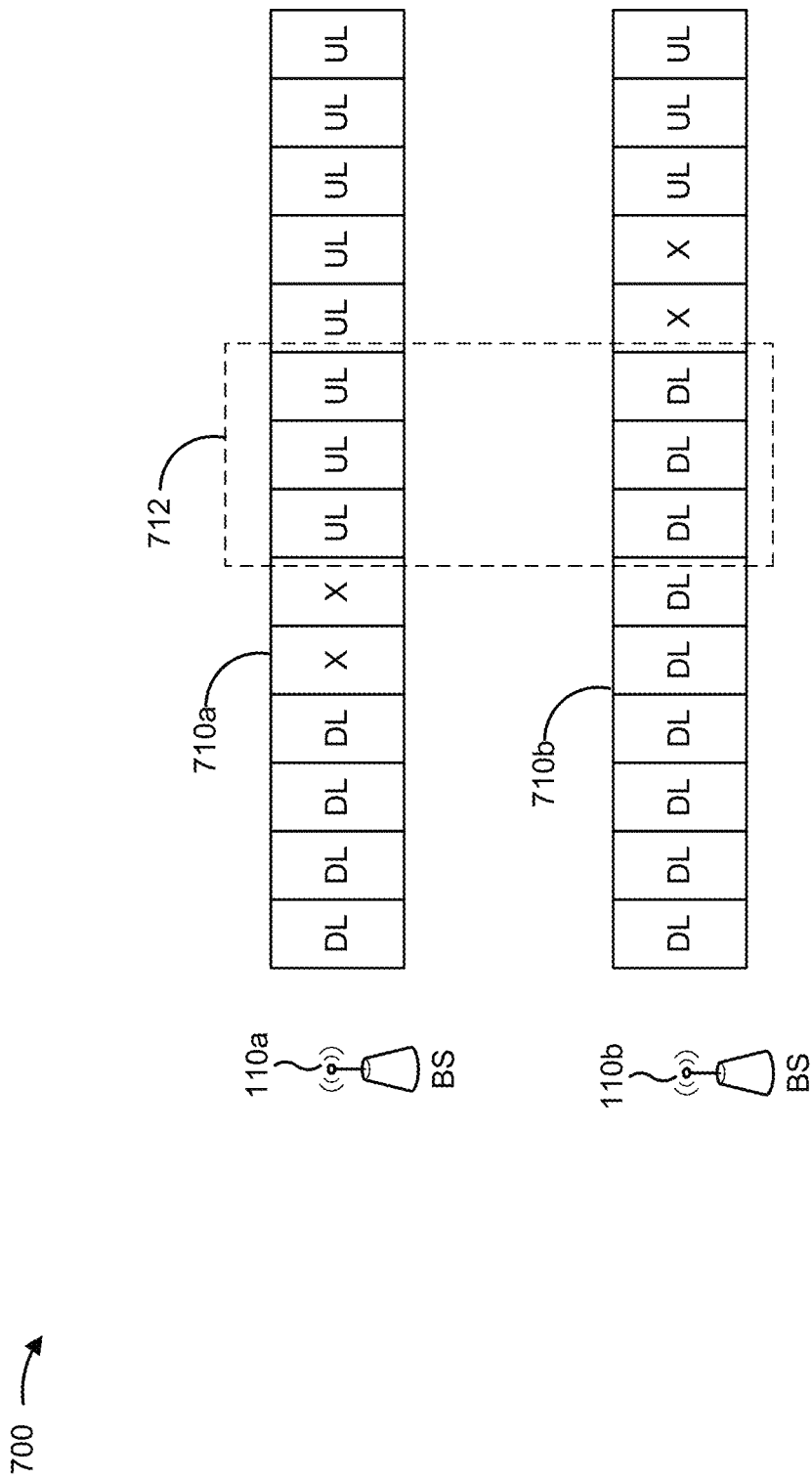
Figure 7C:
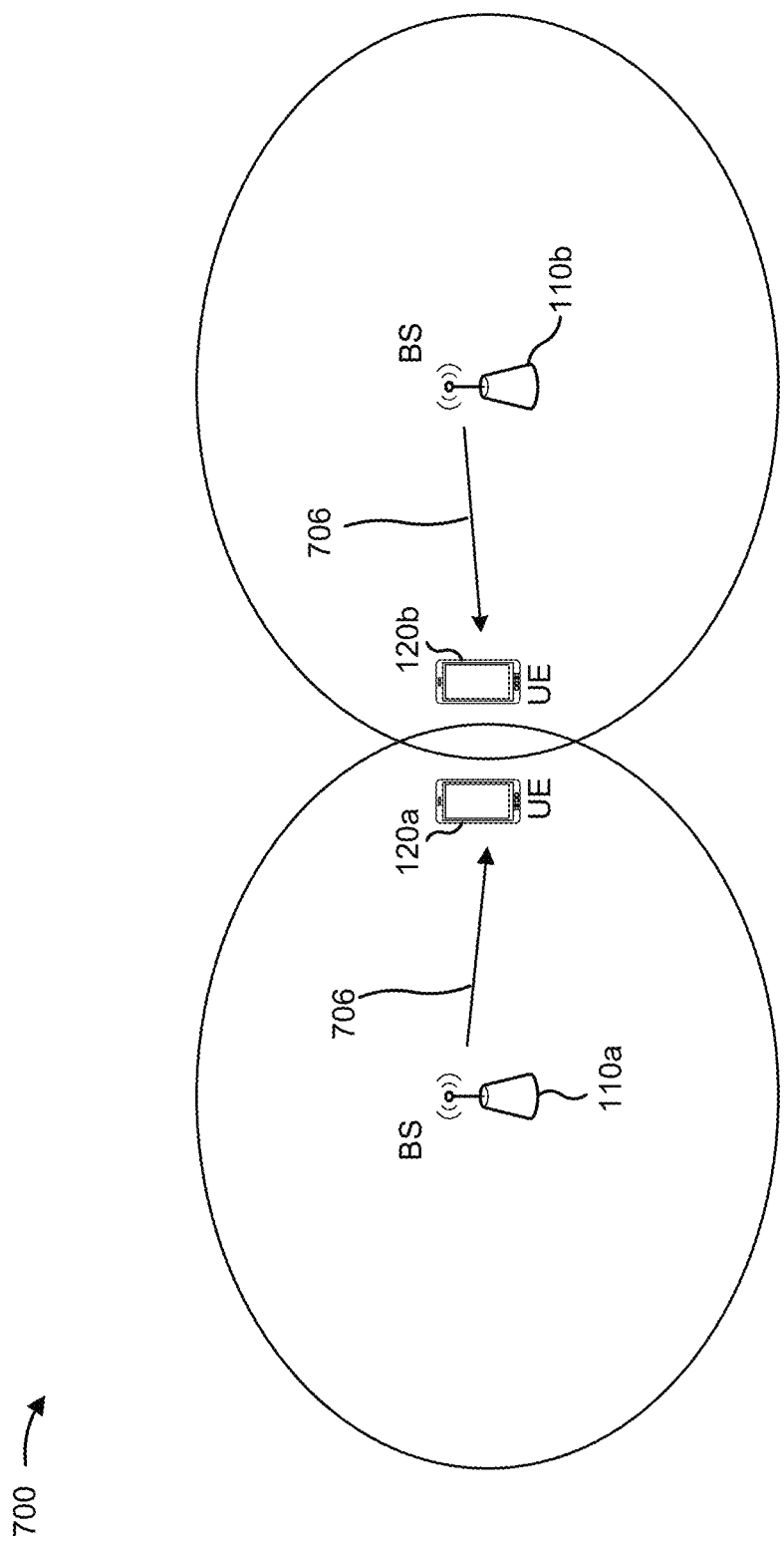

FIGS. 7A-7C are diagrams illustrating an example 700 of cross link interference reference signal configuration, in accordance with various aspects of the present disclosure. As shown in FIGS. 7A-7C, example 700 may include a plurality of base stations (BSs) (e.g., BS 110a, BS 110b, and/or the like) and a plurality of user equipments (UEs) (UE 120a, UE 120b, and/or the like). In some aspects, the plurality of BSs and the plurality of UEs may be included in a wireless network. BS 110a may be a serving BS for UE 120a, and BS 110b may be a serving BS for UE 120b. As shown in FIG. 7A, and by reference number 702, UE 120a may transmit a uplink transmission 702 to BS 110a and UE 120b may receive a downlink transmission 704 from BS 110b.

As described above, some portion of a frame, subframe, or slot may be allocated to downlink transmissions and another portion may be allocated to uplink transmissions. In an aspect, the first symbols in a slot may be for downlink and the last symbols of a slot may be for uplink. In a dynamic TDD system, the number of downlink and/or uplink symbols may be adjusted dynamically to adapt to changing traffic patterns. For example, if downlink traffic to a UE is heavier than uplink traffic, e.g., when the UE is receiving a video, the system may increase the number of downlink symbols in a slot and reduce the number of uplink symbols. Conversely, for a UE that is transmitting more data than it receives, a system may increase the number of uplink symbols and decrease the number if downlink symbols in a slot.

This is shown, for example, in FIG. 7B, wherein the communications between UE 120a and BS 110a may have more uplink (UL) traffic than downlink (DL) traffic. Accordingly, slot 710a is configured with more uplink symbols than downlink symbols. Conversely, the communications between UE 120b and BS 110b may have more downlink traffic than uplink traffic, and slot 710b is configured with more downlink symbols and fewer uplink symbols. As can be seen in FIG. 7B, there are occasions 712 in which uplink transmissions and downlink transmissions may occur during the same slot. These occasions may give rise to cross-link interference.

Referring back to FIG. 7A, UE 120a is transmitting uplink signal 702 while UE 120b is receiving downlink signal 704. In an aspect, some of uplink signal 702 may be received (702') by UE 120b. Depending on their relative signal strengths uplink signal 702 may interfere with reception of downlink signal 704. In some instances, the interference may be so minor that is has no effect. In extreme instances, the interference from UE 120a, the aggressor, may be so severe that reception of the downlink signal by UE 120b, the victim, is precluded and actions to mitigate the CLI must be taken.

To manage potential CLI, e.g., to determine if the level of interference may be tolerated or corrective action is needed, the CLI strength may be measured by the UEs and reported to their respective base stations. In some aspects, a reference signal (RS) may be transmitted by a UE and received or measured by another UE. In an aspect, the measured metrics may include reference signal received power (RSRP), reference signal received quality (RSRQ), and/or received signal strength indicator (RSSI). RSRP is a measurement of a reference signal that can be received and decoded by the receiving UE. RSSI is a measure of the total received power in the bandwidth that is measured. RSSI may include signals from any source and not just from the transmitted reference signal. To determine the CLI strength, a base station may configure one or more UEs to transmit a reference signal. In an aspect, the base station may configure the one or more UEs in a cell to transmit the same reference signal. In another aspect, the base station may configure the one or more UEs to transmit distinctive reference signals. The UE measuring the CLI-RS may report the measurement results to the base station. The measurement results may indicate that the CLI-RS was too strong to measure or detect. This may occur because the receiver is saturated by the CLI-RS.

As shown in FIG. 7C, and by reference number 706, BS 110a and BS 110b may each transmit an instruction, to the one or more UEs that are served respectively by BS 110a and BS 110b, to transmit and/or receive and measure a CLI-RS during a second time window. For example, BS 110a may transmit, to UE 120a, an instruction to transmit a CLI-RS using specified resources, and BS 110b may transmit, to UE 120b, an instruction to receive and measure a CLI-RS on the specified resources, and/or the like. In some aspects, the instruction that is transmitted by BS 110a and BS 110b may be included in a radio resource control (RRC) communication, a downlink control information (DCI) communication, a medium access control element (MAC-CE) communication, and/or the like. In some aspects, the resources may be preconfigured and the instruction may be an instruction to activate the preconfigured resources. For example, in a UE, one or more CLI-RS measurement reports may be configured and inactive. A base station may subsequently activate one of the reports and cause the UE to perform a CLI-RS measurement are send a report.

As indicated above, FIGS. 7A-7C are provided as examples. Other examples may differ from what is described with respect to FIGS. 7A-7C.

In an aspect of the disclosure, it may be desirable to provide resources for the transmission and reception of the CLI-RS. A UE may already be configured to take measurements for radio resource management (RRM). In an aspect, a UE may be configured to measure a channel state indicator reference signal (CSI-RS). The CSI-RS has a configurable frequency and bandwidth. In another aspect, a UE may be configured to receive and measure a synchronization signal block (SSB). Typically, the frequency or bandwidth of an SSB does not change often and the bandwidth of an SSB is narrower than a CSI-RS or other DL channels. Advantageously, processing a narrow band signal may take fewer processing resources to receive and measure.

In an aspect, the CLI-RS may be transmitted within the bandwidth of an SSB. In particular, the CLI-RS may have a bandwidth that is substantially the same or narrower than a bandwidth of a synchronization signal, e.g an SSB. In an aspect, the CLI-RS may have the same center frequency as that of the SSB. Alternatively, the center frequency of the CLI-RS may have a fixed frequency offset from the center frequency of the SSB. In an aspect, parameters associated with the CLI-RS, such as a bandwidth and/or a frequency offset, may be predefined. Alternatively, the parameters may be configured by control signaling, e.g., RRC signaling. In an aspect, one or more sets of parameters may be preconfigured and subsequently activated selectively.

FIG. 8 is a diagram illustrating an example process 800 performed, for example, by a BS, in accordance with various aspects of the present disclosure. Example process 800 is an example where a BS (e.g., BS 110a, BS 110b, and/or the like) performs cross link interference reference signal configuration.

As shown in FIG. 8, process 800 may include receiving a configuration of resources related to resources for a synchronization signal 810. Process 800 may further include transmitting, to another UE, a cross link interference reference signal (CLI-RS) based at least in part on the received configuration of resources. For example, the BS (e.g., using transmit processor 220, controller/processor 240, memory 242, and/or the like) may transmit, to a user equipment (UE), a configuration of resources and instructions to transmit a cross link interference reference signal (CLI-RS) using the configured resources, as described above.

Figure 9:
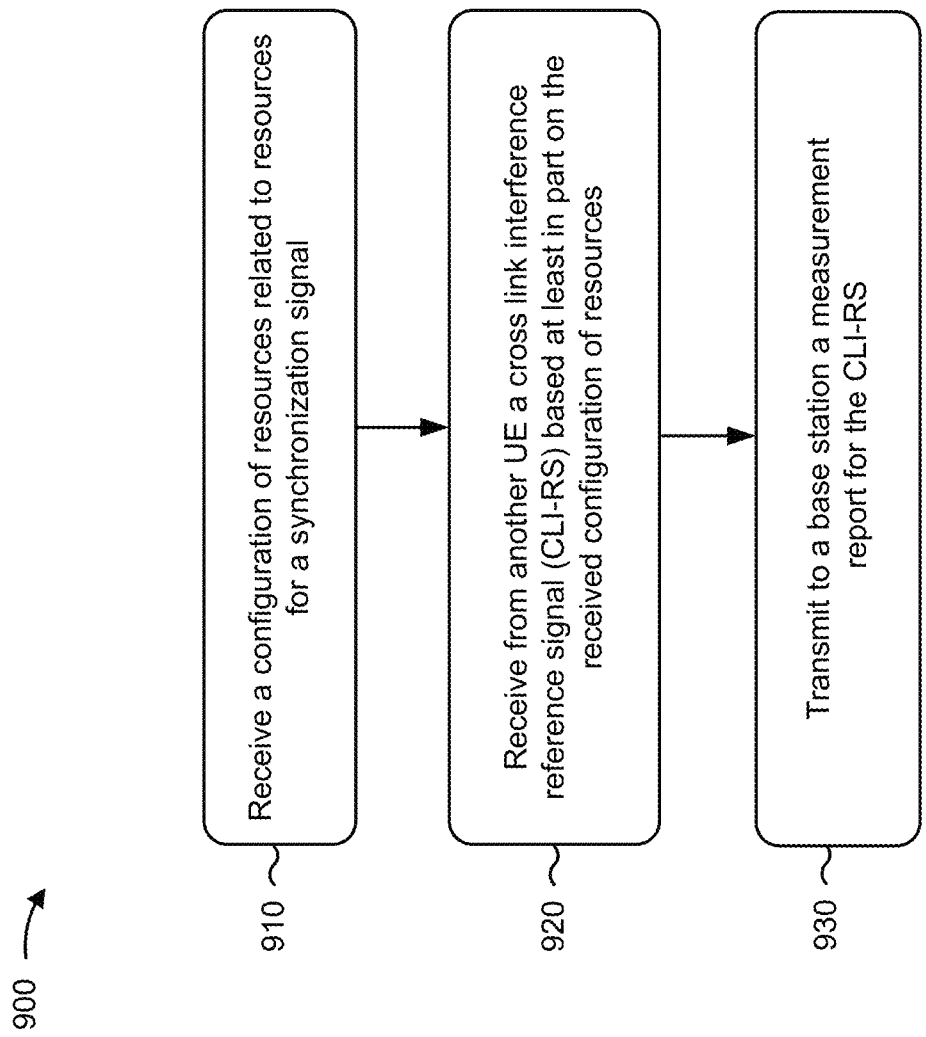

FIG. 9, shows process 900 for measuring and reporting a CLI-RS. As shown, process 900 may include receiving, at 910, a configuration of resources related to resources for a synchronization signal. Process 900 may further include receiving, at 920, from one or more other UEs, a cross link interference reference signal (CLI-RS) based at least in part on the received configuration of resources. At 930, the UE may report a measurement of a CLI-RS received at 920. For example, the BS (e.g., using transmit processor 220, controller/processor 240, memory 242, and/or the like) may transmit, to a user equipment (UE), a configuration of resources; instructions to receive a cross link interference reference signal (CLI-RS) using the configured resources; and instructions and resources to report the measurement, as described above.

Processes 800 and 900 may include additional aspects, such as any single aspect or any combination of aspects described below and/or in connection with one or more other processes described elsewhere herein.

In some aspects, multiple UEs may be causing or experiencing CLI. Accordingly, a base station may configure one UE, a group of UEs, or all UEs it is serving to transmit a CLI-RS or to receive, measure, and report a CLS-RS. When more than one UE transmits a CLI-RS, the UEs may be configured to transmit the same CLI-RS, such that a UE receiving the CLI-RS may not be able to identify which UE is causing the CLI. Alternatively, a base station may configure the multiple UEs to transmit distinctive CLI-RS signals to that a source of the CLI may be determined.

In some aspects, some of the UEs may be configured to measure and report one or more CLI-RS signals received from one or more other UEs. As described above, the CLI-RS signals may be transmitted, received, and reported using configured resources. The resources may be preconfigured and selectively activated, or may be dynamically configured.

Although FIGS. 8 and 9 show example blocks of processed 800 and 900 respectively, in some aspects, processes 800 and 900 may include additional blocks, fewer blocks, different blocks, or differently arranged blocks than those depicted in the corresponding Figs. Additionally, or alternatively, two or more of the blocks of processes may be performed in parallel.

Figure 10:
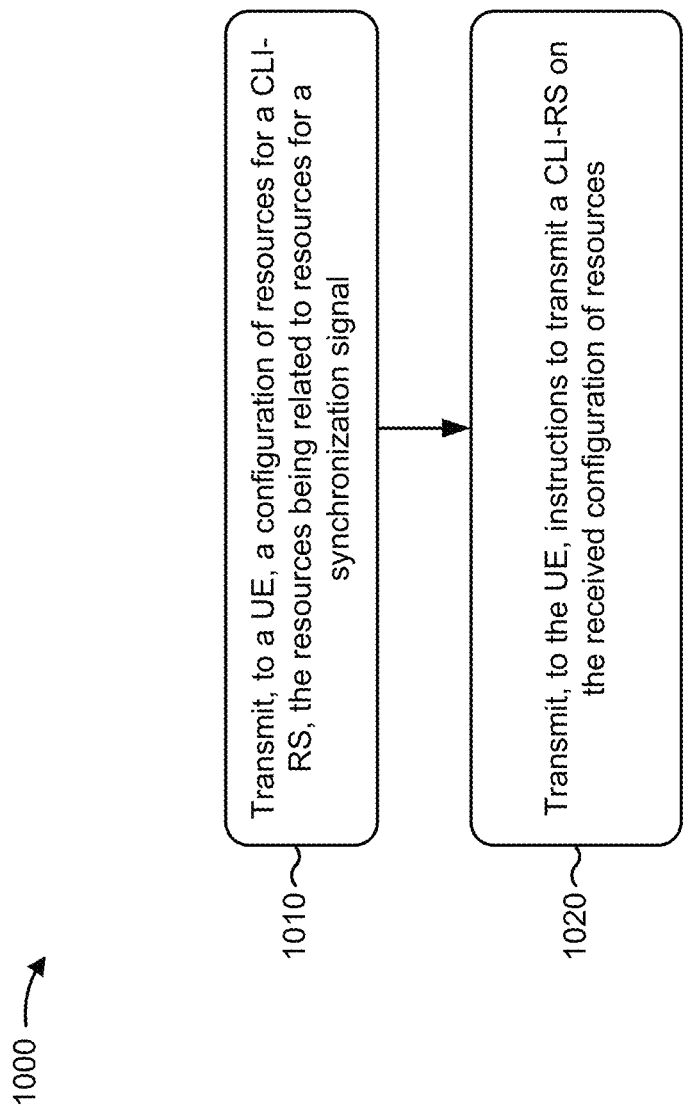
Figure 11:
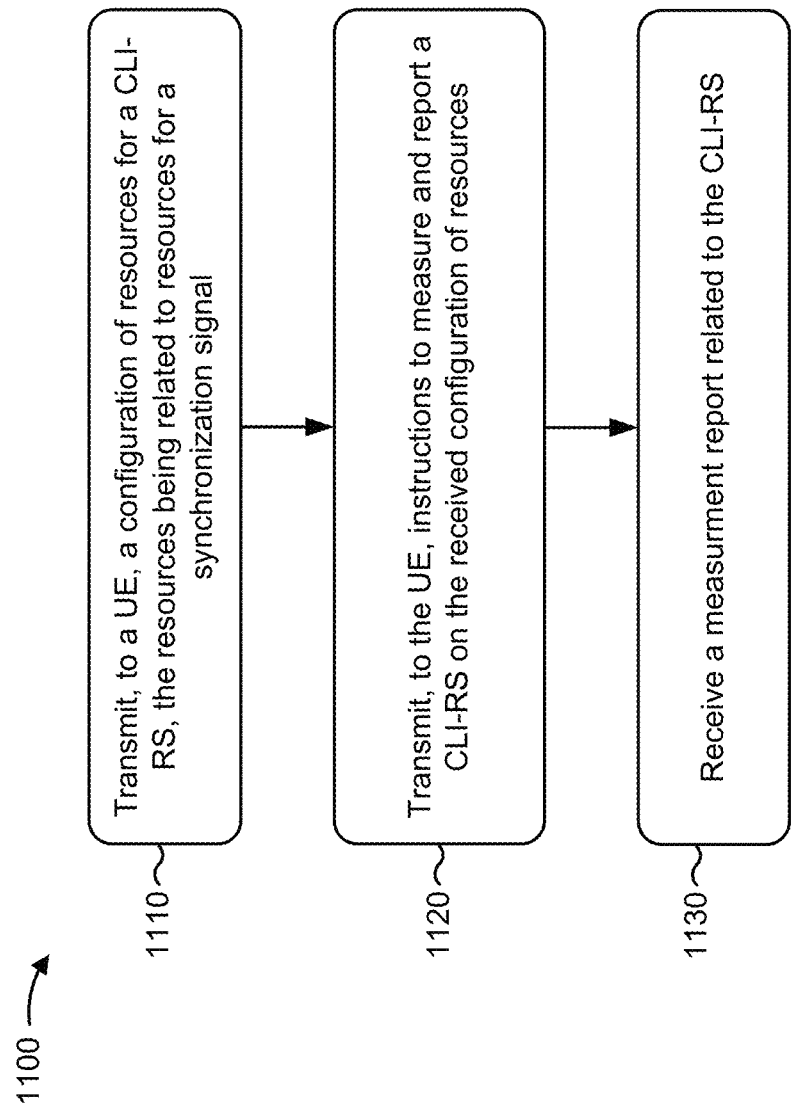

FIGS. 10 and 11 are diagrams illustrating example processed 1000 and 1100 performed, for example, by a BS, in accordance with various aspects of the present disclosure. Example processes 1000 and 1100 are examples where a BS (e.g., BS 110a, BS 110b, and/or the like) instructs a UE to performs cross link interference reference signal configuration.

As shown in FIG. 10, process 1000 may include transmitting, to a UE, a configuration of resources for a CLI-RS, the resources being related to resources for a synchronization signal 1010. Process 1000 may further include 1020 transmitting, to the UE, instructions to transmit a CLI-RS on the received configuration of resources. For example, the BS (e.g., using controller/processor 240, memory 242, and/or the like) may transmit a configuration of resources and instructions to transmit a CSI-RS on the resources, as described above.

As shown in FIG. 11, process 1100 may include transmitting at 1110, to a UE, a configuration of resources for a CLI-RS, the resources being related to resources for a synchronization signal. Process 1100 may further include transmitting at 1120, to the UE, instructions to measure and report a CLI-RS on the received configuration of resources. At 1130, the BS may receive a measurement report related to the CLI-RS. For example, the BS (e.g., using controller/processor 240, memory 242, and/or the like) may transmit a configuration of resources, instructions to measure and report a CLI-RS on the resources, and may receive the measurement report as described above.

Processes 1000 and 1100 may include additional aspects, such as any single aspect or any combination of aspects described below and/or in connection with one or more other processes described elsewhere herein. Furthermore, FIGS. 10 and 11 show example process blocks, in some aspects, process 1000 and 1100 may include additional blocks, fewer blocks, different blocks, or differently arranged blocks than those depicted. Additionally, or alternatively, two or more of the blocks of process may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods, described herein, may be implemented in different forms of hardware, firmware, and/or a combination of hardware and software. The actual specialized control hardware or software code used to implement these systems and/or methods is not limiting of the aspects. Thus, the operation and behavior of the systems and/or methods are described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method for wireless communication at a second user equipment (UE) served by a cell associated with a base station, comprising:
    receiving a configuration identifying resources for transmission of a cross-link interference (CLI) sounding reference signal (SRS) by a first UE, the resources being based on a synchronization signal transmitted by a base station of the first or second UE;
    receiving, from the first UE, the CLI SRS in the resources according to the configuration;
    measuring metrics related to the configured resources; and
    transmitting a report of the measured metric to a base station, wherein the report includes an indication that the CLI SRS was too strong to measure.

2. The method of claim 1, where in the metric is a reference signal received power (RSRP).

3. The method of claim 1, wherein the metric is the total received power (RSSI).

4. The method of claim 1, wherein the bandwidth of the CLI SRS is within the bandwidth of the synchronization signal.

5. The method of claim 1, wherein the bandwidth of the CLI SRS resources is the same as the bandwidth of the synchronization signal.

6. The method of claims 1, wherein the center frequency of the CLI RS is the same as the center frequency of the synchronization signal.

7. The method of claim 1, wherein the center frequency of the CLI RS has a fixed offset from the center frequency of the synchronization signal.

8. The method of claim 1, wherein the second UE receives the CLI RS during an active portion of a DRX cycle.

9. A method for wireless communication at a base station, comprising:
    transmitting, to a second UE, a configuration identifying resources for transmission of a cross-link interference (CLI) sounding reference signal (SRS) by a first UE, the resources being based on a synchronization signal transmitted by a base station of the first or second UE;
    transmitting, to the second UE, instructions to measure the CLI SRS transmitted by the first UE according to the configuration; and
    receiving from the second UE a report of the measured CLI SRS, wherein the report includes an indication that the CLI SRS was too strong to measure.

10. The method of claim 9, wherein the bandwidth of the CLI SRS is within the bandwidth of the synchronization signal.

11. The method of claim 9, wherein the bandwidth of the CLI SRS resources is the same as the bandwidth of the synchronization signal.

12. The method of claim 9, wherein the center frequency of the CLI SRS is the same as the center frequency of the synchronization signal.

13. The method of claims 9, wherein the center frequency of the CLI SRS has a fixed offset from the center frequency of the synchronization signal.

14. The method of claim 9, wherein the resources are preconfigured.

15. The method of claim 9, wherein the resources are configured by control signaling.

16. The method of claims 9, wherein the first UE is configured to transmit the CLI SRS during an active portion of a DRX cycle.

17. The method of claims 9, wherein the second UE is configured to receive the CLI SRS during an active portion of a DRX cycle.

18. The method of claim 9, wherein the second UE measures metrics related to the configured resources.

19. The method of claim 18, where in the metric is a reference signal received power (RSRP) or a total received power (RSSI).

* * * * *